3,155,675
PROCESS FOR THE MANUFACTURE OF
2-β-METHOXYETHYLPYRIDINE
Robert S. Holden, Four Ashes, near Wolverhampton, England, assignor to Imperial Chemical Industries Limited, London, England, a corporation of Great Britain
No Drawing. Filed Oct. 23, 1961, Ser. No. 147,044
Claims priority, application Great Britain, Nov. 3, 1960, 37,833/60
2 Claims. (Cl. 260—297)

This invention relates to a manufacturing process and more particularly it relates to a process for the manufacture of 2-β-methoxyethylpyridine which possesses valuable anthelmintic properties and which is the subject of co-pending U.S. application Serial No. 67,481.

According to the invention we provide a process for the manufacture of 2-β-methoxyethylpyridine which comprises methylation of 2-β-hydroxyethylpyridine.

The 2-β-hydroxyethylpyridine used as starting material may be present in the form of an alkali metal derivative thereof for example the sodium, potassium or lithium derivative.

The methylation process is carried out by use of a methylating agent which may be for example a methyl halide such as methyl chloride, dimethyl sulphate, a reactive methyl ester for example methyl p-toluenesulphonate, or diazomethane.

When the methylation of 2-β-hydroxyethylpyridine is carried out by use of a methyl halide, dimethyl sulphate or a reactive methyl ester such as methyl p-toluenesulphonate, the reaction is preferably carried out in the presence of an acid-binding agent for example a base for example an alkali metal hydroxide such as sodium hydroxide, a metal alkoxide such as sodium methoxide or a metal oxide such as zinc oxide.

When the methylation process is carried out by use of diazomethane, the reaction may optionally be carried out in the presence of a catalyst. Suitable catalysts are boron trifluoride etherate, metal salts for example zinc chloride, metal alcoholates for example aluminium methoxide and ortho esters for example methyl borate.

The said process may conveniently be carried out at ambient temperature for example at about 15–25° C. and it may be accelerated or completed by the application of heat. The process may also conveniently be carried out in the presence of a diluent or solvent which may be an excess of the 2-β-hydroxyethylpyridine used as starting material or it may be for example benzene, toluene, ether, carbon tetrachloride, methanol, isopropanol or water.

The invention is illustrated but not limited by the following examples in which the parts are by weight:

*Example 1*

A solution prepared from 1.15 parts of sodium and 90 parts of 2-β-hydroxyethylpyridine is treated with an excess of methyl chloride (about 10 parts) by passing the gas into the reaction mixture during 4 hours while maintaining the reaction mixture at a temperature of about 15–25° C. The mixture is then filtered and the filtrate is fractionally distilled under reduced pressure. There is thus obtained 2-β-methoxyethylpyridine, B.P. 94–96° C./17 mm.

*Example 2*

A solution prepared from 6.5 parts of potassium and 120 parts of 2-β-hydroxyethylpyridine is treated with an excess of methyl chloride by bubbling the gas into the reaction mixture at 15–25° C. during 4 hours. The reaction mixture is filtered and the filtrate is fractionally distilled under reduced pressure. There is thus obtained 2-β-methoxyethylpyridine, B.P. 94–96° C./17 mm.

*Example 3*

A solution prepared from 4.5 parts of sodium and 120 parts of 2-β-hydroxyethylpyridine is treated with 11 parts of dimethyl sulphate added portionwise with stirring at 15–20° C. After standing for a further one hour, unreacted dimethyl sulphate is destroyed by addition of dilute ammonia solution. The reaction mixture is extracted with benzene and the benzene extract is fractionally distilled under reduced pressure. There is thus obtained 2-β-methoxyethylpyridine, B.P. 94–96° C./17 mm.

*Example 4*

To a solution of 6 parts of sodium in 300 parts of liquid ammonia is added 40 parts of 2-β-hydroxyethylpyridine. 150 parts of benzene are then added, and the ammonia is allowed to evaporate during stirring at 15–25° C. Excess of methyl chloride is bubbled into the suspension of the sodium derivative of 2-β-hydroxyethylpyridine so obtained. The reaction mixture is diluted with water to dissolve the sodium chloride formed and the benzene solution is separated. The benzene is distilled and the residue is fractionally distilled under reduced pressure. There is thus obtained 2-β-methoxyethylpyridine, B.P. 94–96° C./17 mm.

*Example 5*

A solution of 8 parts of diazomethane in 250 parts of ether is added, with stirring, during 30 minutes to a mixture of 30 parts of 2-β-hydroxyethylpyridine and 20 parts of anhydrous zinc chloride. The resultant mixture is kept at 15–20° C. for 18–24 hours during which time most of the ether and any unreacted diazomethane are removed by evaporation. 80 parts of benzene and 100 parts of water are then added and the mixture is stirred and treated with an excess of 50% sodium hydroxide solution to precipitate and redissolve zinc hydroxide. The benzene solution is separated and the aqueous layer is extracted once with 80 parts of benzene. The benzene solutions are combined, the benzene is distilled and the residue is fractionally distilled in vacuo. There is thus obtained 2-β-methoxyethylpyridine, B.P. 94–96° C./17 mm.

*Example 6*

A solution of 78.5 parts of bromobenzene in 120 parts of diethyl ether is added slowly to a stirred mixture of 14 parts of lithium chips in 80 parts of diethyl ether. The mixture is stirred until all the lithium has disappeared. To the solution of phenyllithium thus formed are added 60 parts of 2-β-hydroxyethylpyridine and the mixture is stirred for a further 30 minutes. Methyl bromide (47 parts) is then added over 30 minutes, stirring being maintained during the addition and thereafter for a further 30 minutes. Water is added to the reaction mixture and the aqueous layer so obtained is separated and is extracted with 80 parts of ether. The combined ethereal solutions are fractionally distilled in vacuo. There is thus obtained 2-β-methoxyethylpyridine, B.P. 94–96° C./17 mm.

*Example 7*

32 parts of 2-β-hydroxyethylpyridine and 80 parts of benzene are added to a solution of 6 parts of sodium dissolved in 400 parts of liquid ammonia. After about half of the excess of liquid ammonia has been removed by evaporation, a solution of 46 parts of methyl p-toluenesulphonate in 80 parts of benzene is added slowly and the mixture is stirred for one hour. The remainder of the ammonia is removed by evaporation and 250 parts of water are added. The aqueous layer is separated, basified with sodium hydroxide and the mixture is extracted with 80 parts of benzene. The combined benzene solutions are fractionally distilled in vacuo. There is thus obtained 2-β-methoxyethylpyridine, B.P. 94–96° C./17 mm.

Example 8

To a solution of 1.4 parts of lithium in 120 parts of 2-β-hydroxyethylpyridine are added 19 parts of methyl bromide and the mixture is stirred at 15–25° C. during 4 hours. The reaction mixture is then extracted with benzene and the benzene solution so obtained is fractionally distilled in vacuo. There is thus obtained 2-β-methoxyethylpyridine, B.P. 94–96° C./17 mm.

Example 9

12 parts of 2-β-hydroxyethylpyridine are added to a solution of 16 parts of sodium hydroxide in 100 parts of water. The mixture is stirred at 15–20° C. and 14 parts of dimethyl sulphate are added during one hour. 200 parts of 40% sodium hydroxide solution are added and the mixture is extracted with 100 parts of ether. The ethereal extract is dried over anhydrous sodium sulphate, the ether is removed by evaporation and the residue is distilled in vacuo. There is thus obtained 2-β-methoxyethylpyridine, B.P. 94–96° C./17 mm.

Example 10

5.2 parts of sodium are added to a mixture of 40 parts of isopropanol and 40 parts of anhydrous toluene. The resulting solution is cooled to 0–5° C. and a solution of 28 parts of 2-β-hydroxyethylpyridine in 80 parts of anhydrous toluene is added. After stirring for 6 hours 35 parts of methyl iodide are added and the stirring is continued for a further six hours. The resultant mixture is treated with 250 parts of 25% sodium hydroxide and the non-aqueous layer is separated, dried over anhydrous magnesium sulphate and distilled. There is thus obtained 2-β-methoxyethylpyridine, B.P. 94–96° C./17 mm.

What I claim is:

1. A process for the manufacture of 2-β-methoxyethylpyridine which comprises contacting 2-β-hydroxyethylpyridine with diazomethane at ambient temperature in the presence of a catalyst selected from the group consisting of boron trifluoride etherate, zinc chloride, aluminum methoxide and methyl borate.

2. A process for the manufacture of 2-β-methoxyethylpyridine which comprises contacting the sodium derivative of 2-β-hydroxyethylpyridine with methyl p-toluenesulphonate at ambient temperature in a mixture of benzene and liquid ammonia.

References Cited by the Examiner

FOREIGN PATENTS 629,423    9/49    Great Britain.

OTHER REFERENCES

Wagner and Zook: "Synthetic Organic Chemistry," pp. 226–9 (Wiley) (1953).

Ladenburg: Justus Liebig's Annalen der Chemie, vol. 301, pp. 124–130 (1898).

IRVING MARCUS, *Primary Examiner.*

NICHOLAS S. RIZZO, WALTER A. MODANCE, *Examiners.*